United States Patent [19]

Hoyer

[11] 4,296,913

[45] Oct. 27, 1981

[54] BALL VALVE

[76] Inventor: Ernst H. J. Hoyer, Lohwurt 11, D-2000 Hamburg 57, Fed. Rep. of Germany

[21] Appl. No.: 49,882

[22] Filed: Jun. 19, 1979

[30] Foreign Application Priority Data

Jun. 21, 1978 [DE] Fed. Rep. of Germany ....... 2827720

[51] Int. Cl.³ ............................................. F16K 31/44
[52] U.S. Cl. ........................................ 251/76; 251/77; 251/163
[58] Field of Search ........................... 251/163, 76, 77

[56] References Cited

U.S. PATENT DOCUMENTS 2,200,474  5/1940  Heggem ............................ 251/163
2,847,180  8/1958  Ludeman .......................... 251/163
4,029,292  6/1977  Kramer ............................. 251/163
4,141,536  2/1979  Graham ......................... 251/163 X Primary Examiner—Harold W. Weakley
Attorney, Agent, or Firm—Andrus, Sceales, Starke & Sawall

[57] ABSTRACT

A ball valve having a floating ball and an actuator for rotating the ball reduces operating torques by imparting an initial movement to the ball other than in the valve opening and closing rotation. This initial movement overcomes the adhesion friction, facilitating opening of the valve. The initial movement may be imparted by an asymmetrical configuration in the actuator or ball or means of a spring interposed between the two.

11 Claims, 7 Drawing Figures

BALL VALVE

The present invention relates to a ball valve formed of a housing with inlet and outlet openings for a medium and a ball having a bore and floatingly supported in two rings in the housing. The ball in one of its rotary positions connects the inlet and the outlet and in another of its rotary positions interrupts the inlet and outlet. The ball valve includes an actuator rotatable with the ball and in rotary engagement therewith.

Ball valves, in particular with the ball not in journalled bearings, usually called "floating ball" have, in general, better sealing properties but poorer torque behaviour than so-called journalled ball valves.

The better sealing properties with a floating ball result from the higher surface pressures on the sealing surfaces, while the high torques are attributed to the larger friction radius (ratio of the ball diameter of the journal diameter).

The criterion with actuation of valves is the so-called initial breakaway torque. This proportionately high torque appears with the opening of the valve. It is, inter alia, dependent on the standing period of the valve under one-sided pressure. The magnitude of this breakaway or adhesion torque is, according to the construction principle and the condition of the sliding surfaces, 2 to 5 times as high as the sliding torque of the valve, which is required for the rotation of the ball after the breakaway until the equalization of pressure that is, until the release of the discharge. The torque, which is necessary after the pressure equalization until full opening of the valve (idle or free torque) amounts only to 5 to 15% of the adhesion torque.

This phenomenon is based on the known difference between adhesion friction and sliding friction.

Since valves must often be operated under full pressure differential after very long standing periods with correspondingly high adhesion friction coefficients it follows that all actuating means such as hand levers, gear mechanisms, electrical, hydraulic and pneumatic drives must be designed for the high breakaway torque after long standing periods.

Essential to the present invention is the understanding the knowledge of the fact that the adhesion or breakaway torque is standing period dependent in magnitude. Without very long standing period the adhesion friction does not develop and the breakaway torque corresponds essentially to the sliding torque of the valve. If from this a ball valve can be provided by the operation of which the breakaway or adhesion torque is essentially the same as the sliding torque, the associated operating means could be dimensioned proportionately small, so that the manufacture of ball valves would be essentially simplified. In this connection it should be noted that an exemplary ball valve can have a nominal diameter on the order of magnitude of one meter and that the resulting force for overcoming the adhesion friction lies in the order of magnitude of 1 Mp.

The invention has as its object to provide a ball valve of the initially named type, whose operating mechanism can be formed smaller and in which the breakaway or adhesion torque is only unessentially larger than the sliding torque.

This is provided through a ball valve according to the invention whereby different embodiments are characterized as the constructions of the enclosed patent claims.

For the ball valve according to the invention, in its different exemplary embodiments, it is essential that before the actual turning operation of the ball, the ball is given a movement which does not occur in the direction of the rotary movement between the open and closed position. Indeed, there is herewith concerned a proportionately small movement deviating from the actual rotary movement, which leads to the result, however, that with the following actual rotary movement of the ball essentially smaller torques are necessary, than up till now was the case. Tests have shown that the necessary torque lies in the order of magnitude of the sliding torque, that is, somewhat on the order of the factor of 5 smaller than the otherwise to be expected breakaway or adhesion torque.

Through the movement or rotary movement of the ball immediately preceding the opening process of the ball valve is the time period necessary to the building up of the adhesion torque interrupted and for the opening of the valve only the essentially small sliding torque is to be overcome.

The invention is exemplarily explained further with the aid of the drawing.

Figure 1:
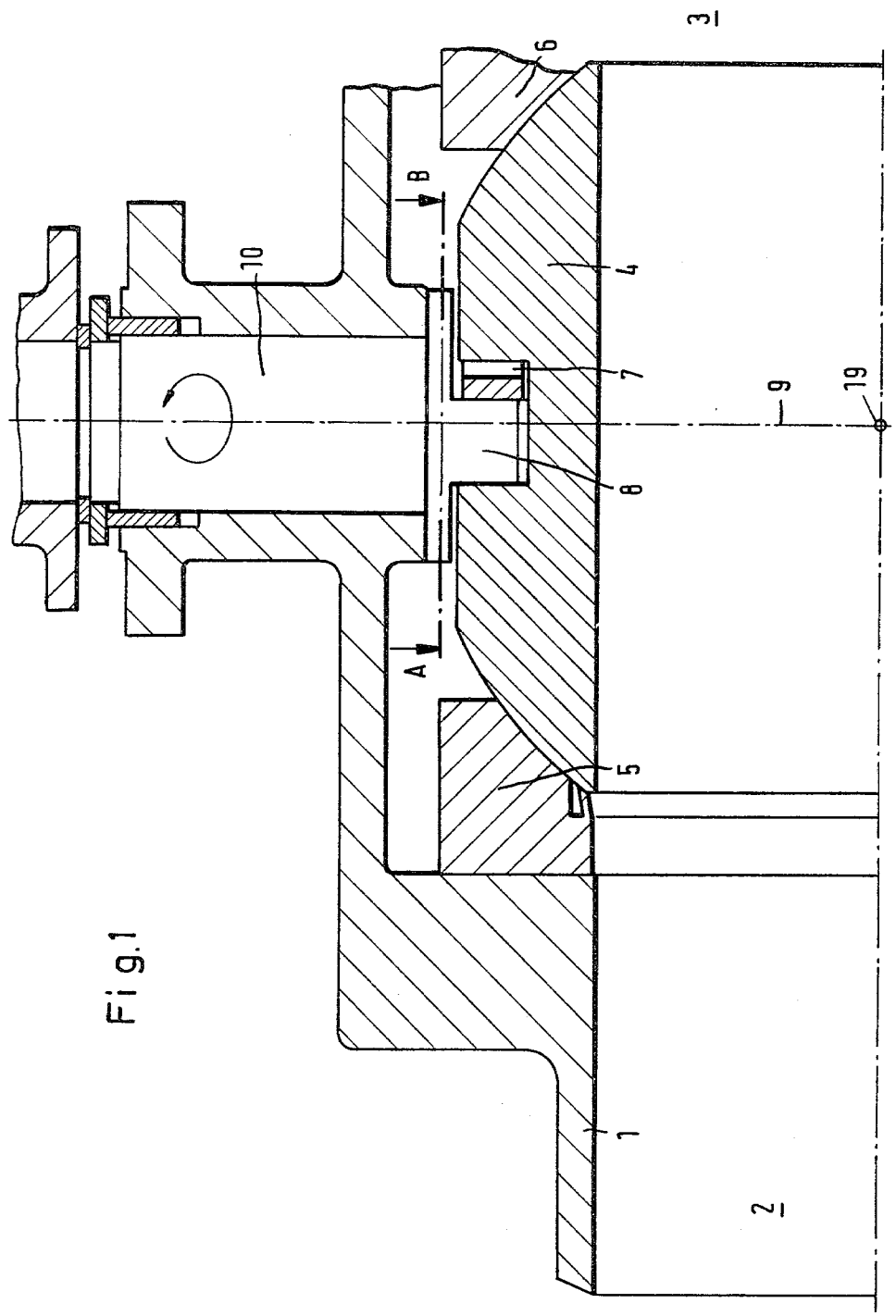
FIG. 1 shows a partial cross-sectional view through a ball valve according to the invention.

In FIG. 1 the housing 1 of a ball valve according to the invention is shown, whereby this housing has an inlet opening 2 and a discharge opening 3. In the inside of the housing is located a ball 4 which is floatingly supported in rings 5 and 6 so that the ball 4 can carry out rotary movements about the axis of rotation 9 to establish a connection between the inlet opening 2 and discharge opening 3 in the position shown. In a position of ball 4 altered by 90° the inlet opening 2 is not in connection with the discharge opening 3.

The ball 4 has a slit 7, in which a part 8 of the actuator 10 projects. The actuator 10 is rotatable about the axis 9 through is not shown means.

Figure 2:
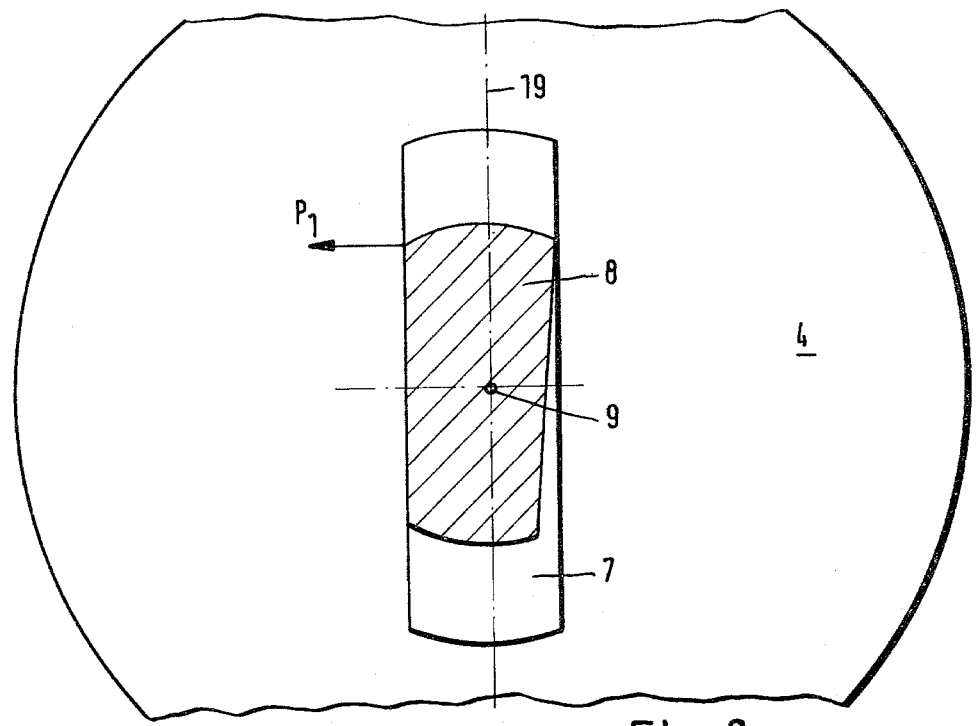
FIGS. 2-7 show different embodiments of ball valves according to the invention, wherein it is apparent that the partial views are taken in the direction of A-B of FIG. 1.
Figure 3:
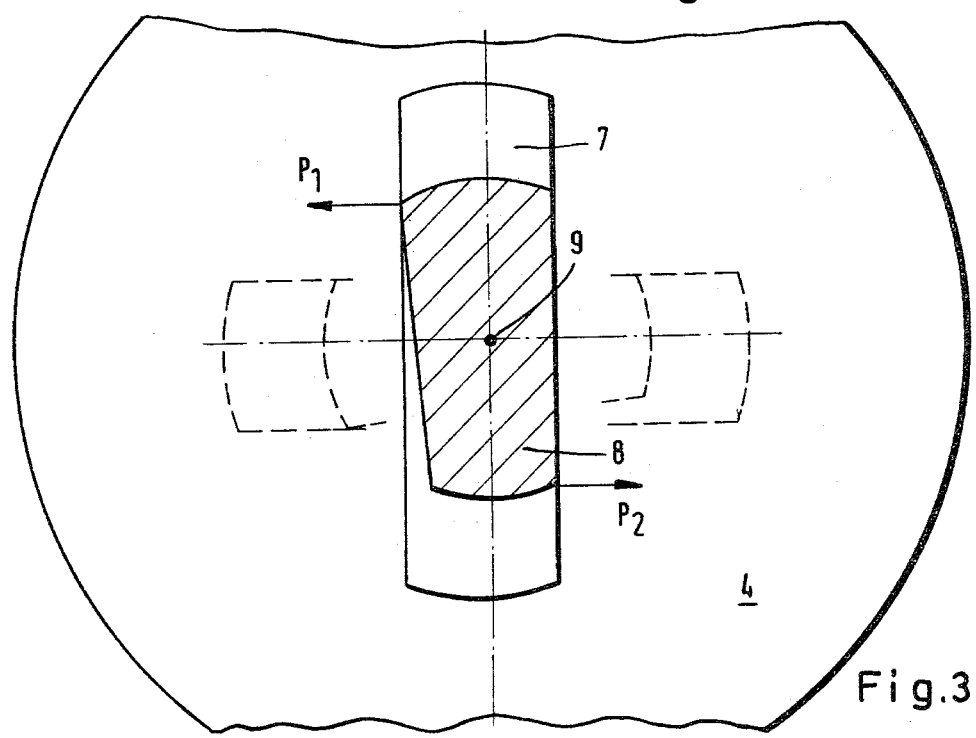

A first exemplary embodiment of a ball valve according to the invention is shown in FIGS. 2 and 3. It is important for this exemplary embodiment that the part 8 of actuator 10 projecting in slit 7 has an essentially wedge form. In contrast to the heretofore known ball valves the part 8 is so formed that its longitudinal sides are not parallel to each other whereas with known valves, the part 8 fits into the slit 7 of the ball 4 with the tightest possible tolerances.

FIG. 2 shows the position of the ball 4 and of the part 8 immediately before the beginning of an operating process. At this point in time, the one longitudinal surface of the wedge 8 lies on the one side of the slit 7 and through rotation of part 8 about the axis of rotation 9 a force $P_1$ is exerted on the ball. Since the oppositely lying surface of part 8 does not lie against the corresponding bordering surface of the slit 7, no torque can be exerted on the ball which could effect a rotation of the ball about the axis of rotation 9. Instead of this a rotation about the axis 19 is performed through the force $P_1$ so that the left part of the ball 4 is rotated downward out of the drawing plane while the right part of the ball is rotated upward out of the plane of the drawing. The axis 19 is in the FIG. 1 likewise represented; it is positioned in that figure perpendicular to the axis 9.

After a proportionately short rotation of ball 4 about the axis 19 the second longitudinal surface of the part 8 arrives at the bordering surface of the slit 7. At this point in time a force $P_1$ is exerted on the ball on the first side of the longitudinal surface of the slit 7 and symmetrically to this an oppositely directed force $P_2$ on the opposite lying longitudinal surface of the slit 7. On the basis of this pair of forces a rotary movement is performed on the ball 4 about the axis 9, so that the ball 4 (FIG. 3) can be rotated to the other position (shown in broken lines).

With respect to the force $P_1$ there is involved a proportionately small force, namely that force which is necessary in order to later produce the sliding torque of ball 4.

Figure 4:
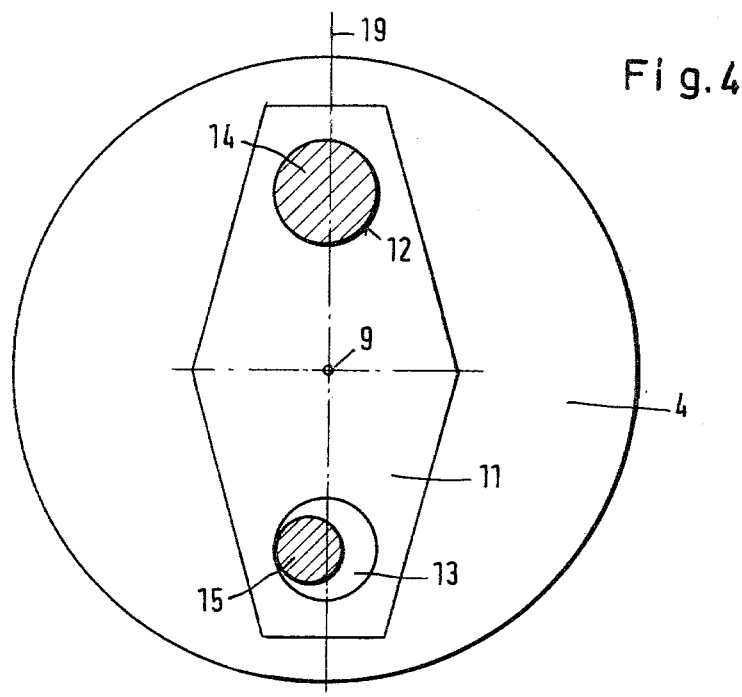
Figure 5:
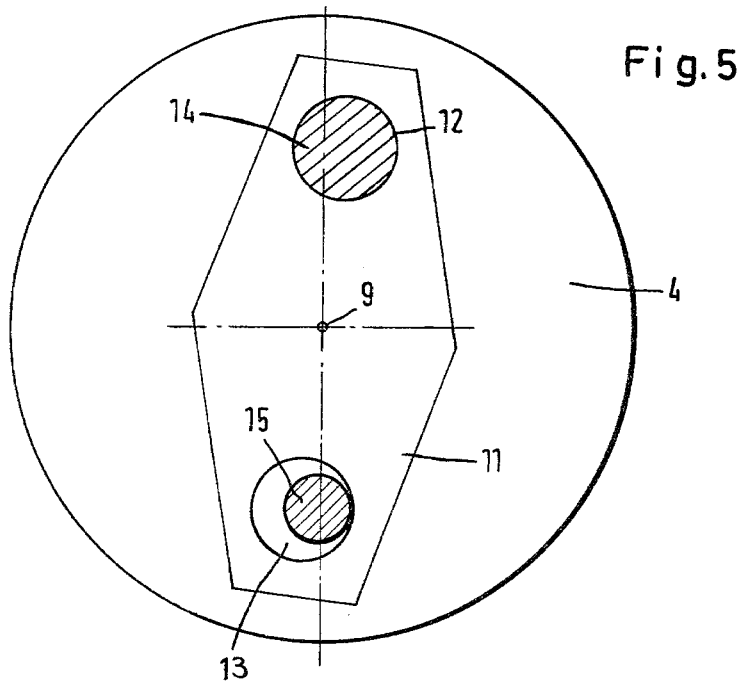

In the FIGS. 4 and 5 a further exemplary embodiment of the ball valve according to the invention is shown. In this case the actuator 10 has a plate 11, which in essence has an elongated form, whereby the plate provides holes 12 and 13 symmetrical to the axis of rotation 9 with similarly sized diameter.

Two pegs 14 and 15 extend from the ball 4, which essentially are aligned with the location of the bores 12 and 13.

The pin 14 is fitted in the bore 12 whereas the pin 15 is smaller than the bore 13.

Accordingly with the rotation of the plate 11 about the axis 9 a force is initially exerted on the ball 4 so that this rotates about the axis 19. When the pin 15 reaches the periphery of hole 13 (FIG. 5) a torque is exerted on the ball 4 so that this rotates about the axis 9.

Figure 6:
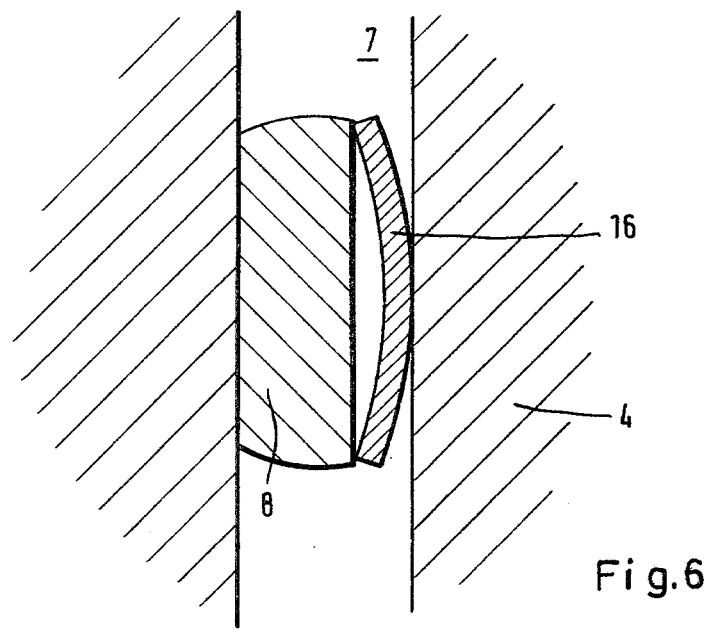
Figure 7:
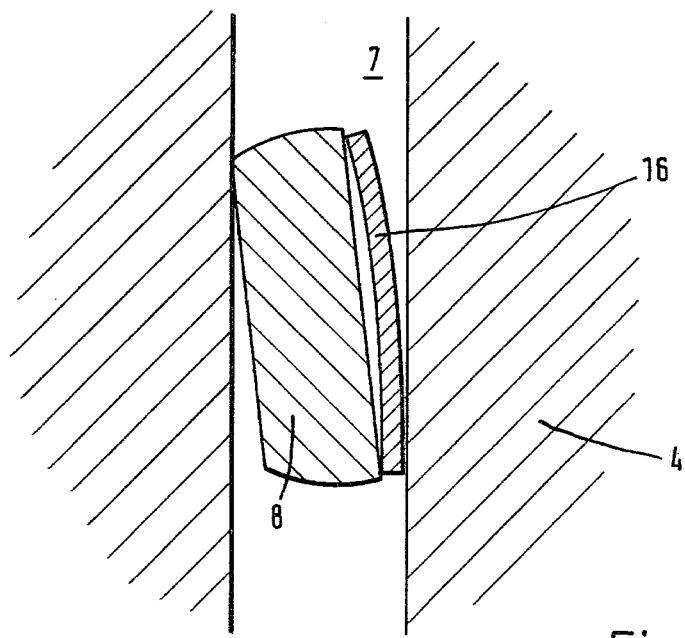

The FIGS. 6 and 7 exemplarily show a further embodiment of the ball valve according to the invention. In the slit 7 in this case a part 8 of actuator 10 is arranged, which is essentially smaller than the slit 7. The remaining space is filled through a plate formed spring 16. The spring 16 is so designed that with the operation of the valve after breakaway of the ball a compression of the spring 16 no longer occurs. With the occurrence of a breakaway torque lying essentially above the running torque the spring must however deflect. It thus occurs that the ball rotates about the axis 19, until the breakaway torque is overcome; then with the lower torque the ball is brought into a rotary movement about the axis 9 through the spring 16 until the element has again been established on the actuator, in order then the normal movement of the actuator to follow.

Instead of the wedge-formed part 8 any type of eccentric can be used, which is in a position to produce a rotary movement in a first direction on the ball 4 and by further rotation of this part result in a rotation in a second direction, whereby these rotary directions preferably are perpendicular to each other.

While part 8 has been shown wedge-formed in FIGS. 2 and 3 and inserted in a rectilinear slit 7, it will be appreciated that slit 7 may be formed in a wedge shaped manner and part 8 formed in a rectilinear manner. Preferably, the surfaces of the wedge shaped member, either part 8 or slit 7, slope toward each other in a ratio of approximately 1:100.

Similarly, while FIGS. 4 and 5 show an embodiment of the invention in which the required asymmetry is obtained by utilizing pin 15 which is smaller than hole 13, it will be appreciated that the same result can be obtained by positioning holes 12 and 13 asymmetrically on plate 11 and utilizing pins which fully occupy the holes. In this embodiment, holes 12 and 13 would not be diametrically opposed.

I claim:

1. A ball valve comprising:
    a housing having inlet and outlet openings for a flow medium;
    a perforated ball floatingly supported in a pair of rings in the housing for rotation about first and second rotary axes displaced from each other and extending through the center of the ball, said ball being rotatable about said first rotary axis to a first position in which the ball connects the inlet and outlet openings and to a second position in which the ball interrupts the inlet and outlet openings; and
    an actuator rotatable with the ball and in engagement therewith, said ball and actuator being so formed that their coaction is capable of imparting an initial movement to the ball about said second rotary axis for overcoming adhesion friction of the ball and thereafter imparts a rotation to the ball about said first rotary axis.

2. The ball valve according to claim 1 wherein the ball and actuator are so formed as to impart an initial movement to the ball about a second rotary axis normal to the first rotary axis.

3. The ball valve according to claim 1 or 2 wherein the actuator has a part extending into a slit of the ball and wherein one of said part and slit is generally rectilinear in form in a plane normal to the first rotary axis and the other is asymmetrically formed in a plane normal to the first rotary axis.

4. The ball valve according to claim 3 wherein said actuator part is asymmetrically formed.

5. The ball valve according to claim 4 wherein the part of the actuator is formed as an eccentric.

6. The ball valve according to claim 4 wherein the part of the actuator is wedge-shaped in form.

7. The ball valve according to claim 3 wherein the slit is asymmetrically formed.

8. The ball valve according to claim 7 wherein the slit is wedge shaped in form.

9. The ball valve according to claim 1 wherein a part of the actuator extends into a slit of the ball and wherein a plate-formed spring is arranged between the part and a side of the slit.

10. The ball valve according to claim 1 wherein the actuator is formed with a plate having a pair of holes and the ball is formed with two projections extending into said holes, at least one of said holes and projections being arranged asymmetrically about the first rotary axis.

11. The ball valve according to claim 1 wherein the actuator has a plate containing a pair of holes arranged symmetrically about the first rotary axis and the ball has a pair of pins inserted in said holes, one of said pins corresponding in dimension to the hole and the other pins being formed smaller than the hole and arranged asymmetrically.

* * * * *